UNITED STATES PATENT OFFICE.

COLBY M. AVERY, OF CHICAGO, ILLINOIS, ASSIGNOR TO THE CHISHOLM, BOYD & WHITE COMPANY, OF ILLINOIS.

PROCESS OF PULVERIZING CALCIUM OXID OR LIME.

SPECIFICATION forming part of Letters Patent No. 682,837, dated September 17, 1901.

Application filed November 1, 1900. Serial No. 35,109. (No specimens.)

*To all whom it may concern:*

Be it known that I, COLBY M. AVERY, a citizen of the United States, residing in the city of Chicago, county of Cook, and State of Illinois, have invented a new and useful Improvement in Processes of Pulverizing Calcium Oxid or Lime, of which the following is a specification.

This invention relates to the process of producing commercially-pure powdered lime from lime in the condition in which it usually comes from the kiln; and my invention has for its object to simplify the process and at the same time render it more thorough.

In the production of lime for ordinary commercial purposes the lime as it leaves the kiln is commonly in compact masses or lumps, frequently containing stone or other foreign matter. When the lime is to be used in cement or concrete as a bond for briquetting flue-dust or analogous purposes, it is necessary to pulverize the lime, and desirable that stone and all insoluble matter be removed. In my process the lime in its original state is placed within a closed receptacle in the presence of steam, and the action of the steam upon the lime is such that small particles in the form of an impalpable powder are thrown off from the hard masses of lime. In order to expose all portions of the surfaces of said masses to the action of the steam, the contents of the receptacle are agitated during the process and caused to pass over a screen or sieve, thereby allowing the powdered portions to be removed. This process is continued until the lime has all been pulverized, and as the stone and insoluble matter are unaffected such masses thereof as are too large to pass the screen remain in the receptacle and are removed from time to time. The object in conducting the process in a closed receptacle is that the lime and steam may be thoroughly and expeditiously commingled and that undue loss of heat or escape of dust may be prevented. Another object in having the receptacle closed is that the lime may not be unnecessarily exposed to the moisture of the air, and thereby become partially "air-slaked," as air-slaking is deleterious; but it is not necessary that said receptacle be air-tight, nor that the pressure therein be substantially above atmospheric pressure. It is preferable that the steam entering the receptacle be substantially dry. The resulting product does not readily deteriorate or become air-slaked when packed in barrels or bags and may be preserved in this manner for a considerable period of time. Moreover, the lime resulting from this process takes on certain of the characteristics of cement and is of considerably greater strength than quicklime pulverized by a crushing process. The product is a dry impalpable powder and in the making of mortar is mixed with water in the ordinary manner.

A suitable device for the pulverizing and separating of lime by this process is shown and described in a separate application for patent, filed by me this day, Serial No. 35,108.

What I claim as my invention, and desire to secure by Letters Patent, is—

1. The process of pulverizing lime consisting of the simultaneous agitation and sifting of said lime in the presence of steam.

2. The process of pulverizing and separating lime from foreign matter consisting in simultaneously subjecting said lime to the action of steam in a confined space and agitating and sifting said lime.

In testimony whereof I have signed my name to this specification in the presence of two subscribing witnesses.

COLBY M. AVERY.

Witnesses:
CHARLES L. HERRICK,
ARTHUR M. COX.